United States Patent [19]

Hilliard

[11] Patent Number: 4,718,939
[45] Date of Patent: Jan. 12, 1988

[54] RECYCLING SUPERALLOY SCRAP BY VAPOR PHASE ZINC EMBRITTLEMENT

[75] Inventor: Henry E. Hilliard, Greenbelt, Md.

[73] Assignee: The United States of America as represented by the Secretary of the Interior, Washington, D.C.

[21] Appl. No.: 946,470

[22] Filed: Dec. 24, 1986

[51] Int. Cl.$^4$ .................... C22B 7/00; B02C 23/18
[52] U.S. Cl. ..................... 75/0.5 R; 75/82; 75/63; 241/23
[58] Field of Search ............ 75/0.5 R, 82, 63; 241/23, 12, 18, 15

[56] References Cited

U.S. PATENT DOCUMENTS

| | | | |
|---|---|---|---|
| 2,354,727 | 8/1944 | Wulff | 241/15 |
| 3,643,873 | 2/1972 | George | 241/15 |
| 3,666,437 | 5/1972 | Mehl et al. | 75/82 |
| 3,847,594 | 11/1974 | Von Der Meulen et al. | 75/63 |
| 4,272,463 | 6/1981 | Clark et al. | 264/12 |
| 4,273,294 | 6/1981 | Hollely et al. | 241/18 |

*Primary Examiner*—L. Dewayne Rutledge
*Assistant Examiner*—David W. Schumaker
*Attorney, Agent, or Firm*—E. Philip Koltos; Thomas Zack

[57] ABSTRACT

A method of making superalloy scrap friable in order to allow greater recovery of metal values therein is disclosed whereby the scrap is treated with zinc vapor. After exposure to the zinc vapor, the metal scrap becomes friable so that it can be easily crushed. Thereafter, the metal values, particular of cobalt and nickel, can be easily recovered. The process can be made continuous by recovering and reusing the excess zinc vapor used in the treatment.

9 Claims, No Drawings

RECYCLING SUPERALLOY SCRAP BY VAPOR PHASE ZINC EMBRITTLEMENT

FIELD OF THE INVENTION

The invention relates to a method of recovering metal values from superalloy scrap.

BACKGROUND OF THE INVENTION

Over the past few years, "superalloys" have been utilized to a greater extent, and production of these metals has increased, because of the need for articles having the unique properties of these materials. Among these properties are high temperature strength, high temperature oxidation resistance and corrosion resistance. With the increase in use of these superalloys, the amount of scrap and other waste metals containing them grows as well. The superalloy scrap can include such products as turnings, grindings, mold gates, flashings, etc., in addition to used metal parts.

Superalloys are commonly comprised of nickel, cobalt and chromium, with lesser amounts of molybdenum, tungsten, aluminum, iron, and niobium as well. The potential recovery of large amounts of nickel, cobalt, and chromium thus makes recovery of metal values from the scrap very important, as these elements can be reused in the making of more superalloy material.

However, superalloy scrap has generally presented various problems with regard to recovery of these elements. In some cases superalloy scrap has been downgraded and, sold for its nickel content with the subsequent loss of the other alloying elements or similar disposal steps have been taken, because the individual metal values cannot be isolated for reuse. Several other methods of recovering metal values from such scrap have been attempted, but these methods all have certain drawbacks.

One method, as disclosed in U.S. Pat. No. 3,649,487, is to melt the metal scrap along with non-metallic substances, such as silicon and carbon, form the melt into an anode, and electrolyze the anode in a neutral or acid bath. This method requires complex processing of the scrap, results in loss of some of the elements, and is hard to make into a continuous process. Another method employed, as disclosed in U.S. Pat. No. 3,607,236 and 4,442,073, involves placing the superalloy scrap in an acidic aqueous solution and extracting the metal components through various means. This method suffers from the drawback that a specific oxidation state must be reached for proper extraction of most of the metal elements involved, and loss of some elements occurs through improper oxidation. Finally, dissolution of the scrap in molten aluminum has been employed, as disclosed in U.S. Pat. No. 2,946,677, but this process adds impurities to the metals recovered and is also hard to make continuous. It is thus desirable to have a process which can maximize recovery of metal values from superalloy scrap, and which can be run continuously as well.

SUMMARY OF THE INVENTION

There is provided in the present invention a method of recovering metal values from superalloy scrap which overcomes many of the problems associated with the prior art. It has been discovered that treating superalloy scrap with zinc vapor turns such metal friable and allows for a more complete recovery of the metal values therein. The zinc vapor is applied at a temperature which maintains the zinc in vapor form, generally 800°–900° C., and the process is carried out until the decomposition of the scrap is completed, generally 8–12 hours. Once the scrap has been made friable, it is easily crushed, and maximum recovery of the metal is made by subsequent hydrometallurgic procedures. The process of the present invention allows for maximum recovery of nickel, cobalt, chromium, molybdenum, tungsten, and niobium, as well as any other elements found in the superalloy scrap.

The process of the present invention is also advantageous and superior to the prior art in that it can easily be made to be run continuously. During this process, excess zinc vapor can be recovered and recycled so as to treat more superalloy scrap, and make the process as efficient as possible.

DETAILED DESCRIPTION OF THE PREFERRED EMBODIMENT

The superalloy scrap treated in the present invention is primarily composed of nickel, cobalt and chromium, and secondarily molybdenum, tungsten, and niobium. This scrap may be pretreated with an organic solvent or other washing solution which removes impurities such as dirt and the like prior to the treatment of the present invention.

The method of the present invention is carried out by placing a desired amount of superalloy scrap in a container, and subjecting the container to a flow of zinc vapor which is sufficient to decompose the amount of scrap present. It is desirable that the container of scrap be kept at a temperature above the zinc vapor dew point throughout the treatment process. This temperature must be at least around 800° C., but temperatures above 800° C. are preferred. Generally, use of temperatures in the range of from about 800° C. to about 1000° C. will be sufficient to ensure that the zinc is maintained in the vapor form which will allow efficient breakdown of the scrap. It is preferred that the zinc is heated to a temperature of about 900° C. The time needed for the reaction will be based upon the amount and nature of scrap present. Generally, however, 8 to 12 hours is usually sufficient to achieve maximum breakdown of the scrap, and to give a sufficiently friable product.

After treatment in this manner, the friable scrap metal is easily crushed to a powder so that maximum recovery of the metal values can be accomplished by conventional hydrometallurgical procedures. Such procedures generally involve putting the powder in acid solutions, and subsequently separating out the metals through electrochemical means. The superalloy scrap in the powder stage is preferably dissolved in hydrochloric or sulfuric acid before the final electrochemical recovery of the metal values.

Treatment of superalloy scrap according to the method of the present invention is readily made into a continuous process. With such a process, it is desirable to recycle the zinc vapor used so that it can continuously treat greater amounts of scrap. This is readily accomplished through the use of means to withdraw and collect the excess zinc vapor, as well as recycling means to reapply the zinc vapor to the superalloy scrap. This aspect of the invention can be carried out through a vacuum or other suction means, and the excess zinc vapor can be gathered and readmitted to the container holding the scrap.

One particularly preferred embodiment of the present invention is carried out by placing the superalloy scrap to be treated in an evacuated container with molten zinc. This can be accomplished by placing a sufficent amount of zinc at the bottom of the container, and placing a screen of cermaic or other suitable material above the zinc so that it can be kept from directly contacting the scrap.

Next, the desired amount of superalloy scrap is placed in the evacuated container above the zinc and ceramic material. The container is then sealed and evacuated, after which heat is applied. For small amounts of scrap, such as a pound or less, an amount of zinc between about a quarter of a pound to about a pound can be used. When these amounts of scrap and zinc metal are in place, the container is heated to a temperature sufficient to melt the zinc and create zinc vapor which flows over the scrap for a time sufficient to produce a friable metal product. The decomposition of small amounts of scrap can be completed by heating the container to about 900° C., and maintaining the heat for about 12 hours.

Following completion of the decomposition step, excess zinc is vacuum distilled from the container. Vapor produced during the distillation step can be used to treat more scrap. After the distillation step the finished scrap metal may be removed from the container. Any remaining zinc from the operation can be collected and can be used in subsequent treatment of scrap. The resulting scrap metal product is now in a friable state, and is easily crushed to a powder. This powder retains very little of the zinc, and can be further treated by conventional hydrometallurgic procedures to effect maximum recovery of the metal values in the superalloy scrap.

The present invention is further illustrated in the following specific example:

EXAMPLE

One hundred eighty seven grams of zinc were placed inside a furnace tube. A square cell ceramic filter was sealed 3 inches above the surface of the zinc. A 134-gram turbine blade was placed in the tube on top of the filter. The turbine blade was nickle-base alloy with chromium, molybdenum, and niobium alloying elements. The tube was sealed, evacuated, and heated to 900° C. for 12 hours, at which time the reaction of the turbine blade with zinc vapor was substantially complete. Excess zinc was vacuum distilled from the tube and the tube cooled to room temperature. The resulting product was friable, easily crushed to a powder, and contained less than 1 percent zinc.

While the present invention has been described with respect to an exemplary embodiment, it will be appreciated by those of ordinary skill in the art that variations and modifications can be effected within the scope and spirit of the invention.

I claim:

1. A method of preparing superalloy scrap for recovery of the metal values therein comprising the step of treating the scrap with zinc vapor to form a friable product.

2. A method for preparing superalloy scrap for recovery as claimed in claim 1 and further including the steps of collecting and recycling of the excess zinc vapor.

3. A method of preparing superalloy scrap for recovery as claimed in claim 1 including the steps of placing the scrap in a container with molten zinc, and heating the container so that zinc vapor is produced and reacts with the scrap to form a friable products 4. A method of preparing superalloy scrap for recovery as claimed in claim 3 therein comprising heating the container to a temperature of at least 800° C.

5. A method of preparing superalloy scrap for recovery as claimed in claim 3 therein comprising heating the container to a temperature from between about 800° C. to about 1000° C.

6. A method of preparing superalloy scrap for recovery as claimed in claim 3 therein comprising heating the container at a temperature of about 900° C.

7. A method of preparing superalloy scrap for recovery as claimed in claim 3 comprising treating the scrap with zinc vapor for a period of about 8 to 12 hours.

8. A method of preparing superalloy scrap for recovery as claimed in claim 1 wherein the superalloy scrap consists primarily of cobalt, nickel and chromium.

9. A method of preparing superalloy scrap for recovery as claimed in claim 1 wherein the superalloy scrap includes molybdenum, tungsten and niobium.

* * * * *